(12) United States Patent
Perisic et al.

(10) Patent No.: US 9,048,766 B2
(45) Date of Patent: Jun. 2, 2015

(54) METHOD AND APPARATUS FOR MONITORING AND CONTROLLING A SYNCHRONOUS ELECTRIC MACHINE

(71) Applicant: GM GLOBAL TECHNOLOGY OPERATIONS LLC, Detroit, MI (US)

(72) Inventors: Milun Perisic, Cypress (CA); Silva Hiti, Redondo Beach, CA (US); Constantin C. Stancu, Anaheim, CA (US); Peter J. Savagian, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 13/937,309

(22) Filed: Jul. 9, 2013

(65) Prior Publication Data

US 2015/0015178 A1    Jan. 15, 2015

(51) Int. Cl.
*H02P 6/08*    (2006.01)

(52) U.S. Cl.
CPC ........................................ *H02P 6/08* (2013.01)

(58) Field of Classification Search
CPC ............................................................ H02P 6/08
USPC .......................................... 318/717, 716, 700
See application file for complete search history.

(56) References Cited

U.S. PATENT DOCUMENTS 7,560,895 B2 *    7/2009   Arnet ............................ 318/778

* cited by examiner

*Primary Examiner* — David S Luo

(57) ABSTRACT

Controlling a synchronous electric machine includes determining a rotor field current of a wound rotor of the synchronous electric machine and determining a time-rate change in field flux linkage. A rotor field voltage is determined based upon the time-rate change in the field flux linkage, and a rotor field resistance is determined based upon the rotor field voltage and the rotor field current. A rotor temperature is determined based upon the rotor field resistance. Operation of the synchronous electric machine is controlled responsive to a torque command and the rotor temperature.

13 Claims, 2 Drawing Sheets

METHOD AND APPARATUS FOR MONITORING AND CONTROLLING A SYNCHRONOUS ELECTRIC MACHINE

TECHNICAL FIELD

This disclosure is related to electric machines.

BACKGROUND

The statements in this section merely provide background information related to the present disclosure. Accordingly, such statements are not intended to constitute an admission of prior art.

Electric machines apply electromagnetic principles to generate torque on a shaft that can be transferred to and employed in a mechanical system. Vehicle systems employ electric machines in traction operations, including generating propulsion torque from stored electric power and generating electric power from vehicle kinetic energy in a regenerative braking function. There are numerous configurations of electric machines, including, e.g., synchronous motor devices, permanent magnet devices, and stepper motors. One critical parameter related to operation and durability of an electric machine is its temperature.

SUMMARY

Controlling a synchronous electric machine includes determining a rotor field current of a wound rotor of the synchronous electric machine and determining a time-rate change in field flux linkage. A rotor field voltage is determined based upon the time-rate change in the field flux linkage, and a rotor field resistance is determined based upon the rotor field voltage and the rotor field current. A rotor temperature is determined based upon the rotor field resistance. Operation of the synchronous electric machine is controlled responsive to a torque command and the rotor temperature.

BRIEF DESCRIPTION OF THE DRAWINGS

One or more embodiments will now be described, by way of example, with reference to the accompanying drawings, in which.

DETAILED DESCRIPTION

Figure 1:
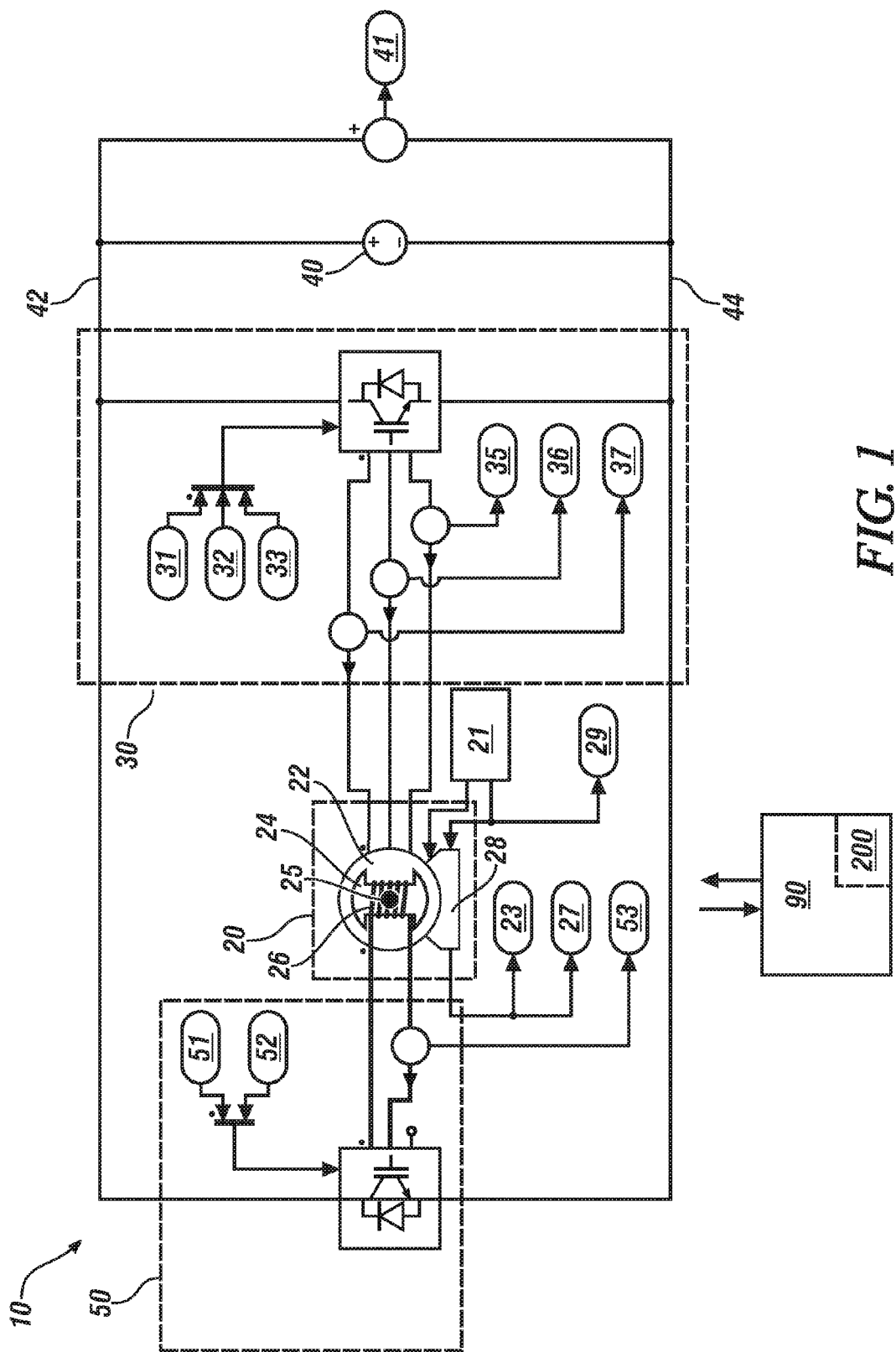
FIG. 1 illustrates an electrical system including a wound rotor synchronous electric machine in accordance with the disclosure.

Referring now to the drawings, wherein the showings are for the purpose of illustrating certain exemplary embodiments only and not for the purpose of limiting the same, FIG. 1 schematically illustrates an exemplary electrical system 10 including a wound rotor synchronous electric machine (electric machine) 20 employing a stator 22, a wound rotor 24 rotatably assembled onto a shaft member 25, a motor monitor 28, a power inverter 30, a high-voltage electric power supply 40 including a high-voltage bus having a positive high-voltage bus 42 and a negative high-voltage bus 44, a rotor inverter 50, and controller 90. The wound rotor 24 includes a plurality of field windings 26 fabricated from insulated wiring.

The rotor inverter 50 electrically connects to the field windings 26 of the wound rotor 24. In operation, the rotor inverter 50 generates a high frequency AC signal that electrically excites the field windings of the wound rotor 24, inducing a field current $I_f$ and creating north and south magnetic polarities thereon. The rotor inverter 50 is preferably a switched power supply inverter that is coupled to the high-voltage electric power supply 40 via the positive high-voltage bus 42 and the negative high-voltage bus 44. The rotor inverter 50 is a two-phase device (positive and negative) with each of the phases having a two-level H-bridge fabricated from IGBTs or other suitable high-voltage switches, which are controlled in response to commands including a positive signal dp 51 and a negative signal dn 52. The positive signal dp 51 and negative signal dn 52 are generated at a high frequency and originate in the controller 90. The rotor inverter 50 impresses the high frequency signals dp 51 and dn 52 upon the field windings 26 of the rotor 24. The system is equipped with an ammeter or another suitable device for monitoring the field current $I_f$ 53.

The power inverter 30 electrically connects to stator windings of the electric machine 20 and the wound rotor 24 forms a secondary port of the electric machine 20. In operation, the power inverter 30 generates a multiphase PWM signal that passes through stator windings of electric machine and generates electromagnetic energy that acts upon the wound rotor 24 causing it to rotate on the shaft member 25. Thus, the electric machine 20 generates torque on the shaft member 25 in response to control signals from the power inverter 30 and the rotor inverter 50. The power inverter 30 is a multi-phase switched power supply inverter that is coupled to the high-voltage electric power supply 40 via the positive high-voltage bus 42 and the negative high-voltage bus 44. The power inverter 30 is illustrated as a three-phase device with each of the phases having a two-level inverter fabricated from IGBTs or other suitable high-voltage switches that electrically connect between the positive high-voltage bus 42 and the negative high-voltage bus 44, and control electrical excitation to the windings of the stator 22 in response to motor PWM commands da 31, db 32 and dc 33, which originate in the controller 90. The system is equipped with ammeters or other suitable devices for monitoring motor currents Ia 35, Ib 36, and Ic 37.

The motor monitor 28 is a composite element for monitoring parameters of the electric machine 20, and can include sensors and/or estimation schemes. One monitored parameter is stator temperature 23, which can be monitored by a thermocouple, a thermistor or another suitable device. One monitored parameter is rotational position 27 (from which speed is derived) of the wound rotor 24, which can be monitored by a resolver or another suitable rotational position monitoring system. Other parameters may be monitored as necessary.

Controller 90 is configured to generate the motor PWM commands da 31, db 32, dc 33, dp 51 and do 52 to control the electric machine 20 responsive to a torque command, e.g., commanded motor torque 29. Controller 90 is configured to monitor a plurality of operating states, including the motor currents Ia 35, Ib 36, Ic 37, high-voltage DC link Vdc 41 across the high-voltage electric power supply 40, the field current $I_f$ 53, stator temperature 23, and rotational position output from the resolver 27. The controller 90 is preferably configured to execute a temperature estimation routine 200, an embodiment of which is described with reference to FIG. 2.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, or each 3.125, 6.25, 12.5, 25 and 100 milliseconds during ongoing engine and vehicle operation. Alternatively, routines may be executed in response to occurrence of an event.

Figure 2:
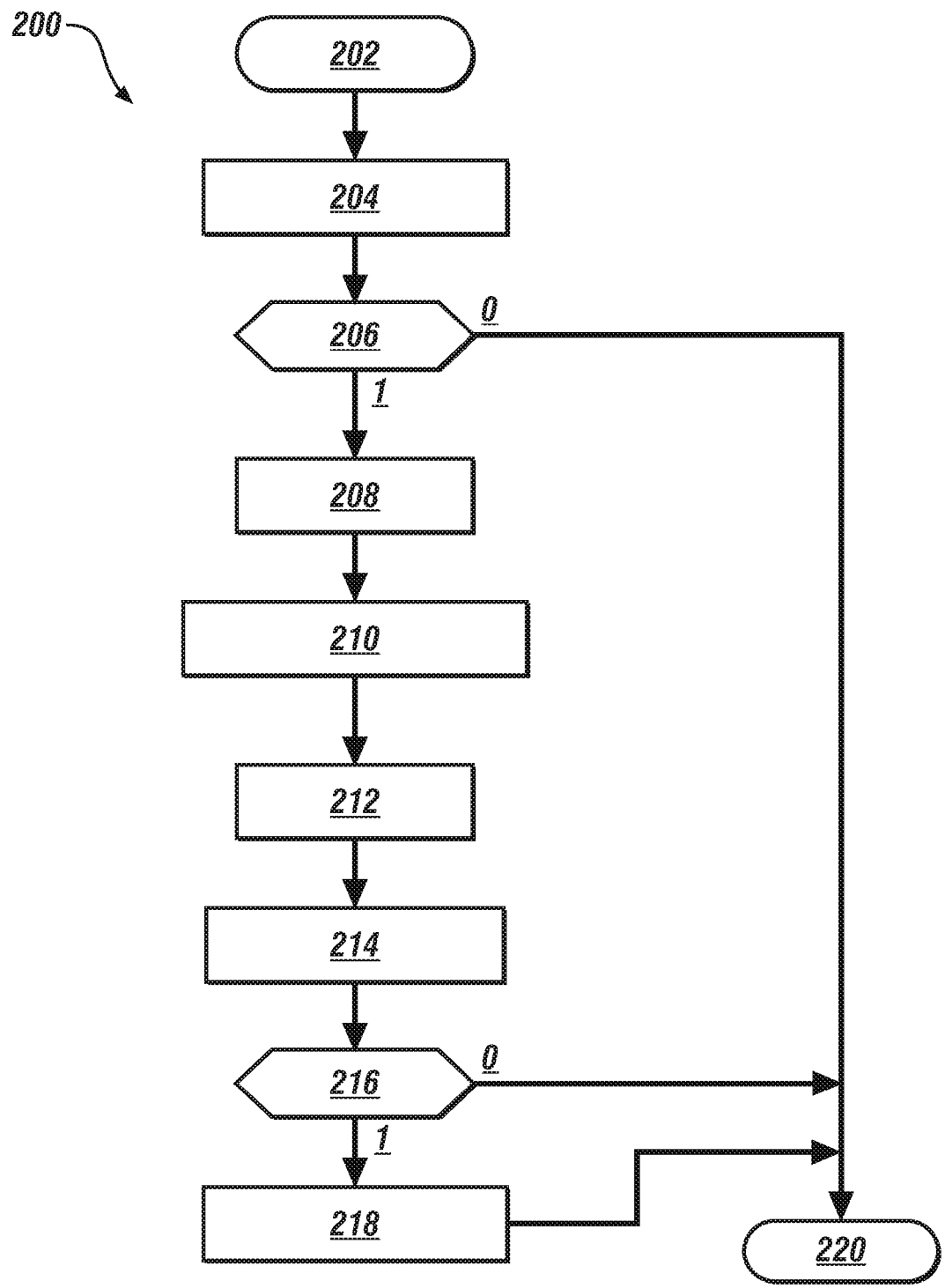
FIG. 2 illustrates a flowchart for a temperature estimation routine for monitoring and controlling operation an embodiment of the electric machine described with reference to FIG. 1, in accordance with the disclosure.

FIG. 2 illustrates a flowchart associated with an embodiment of the temperature estimation routine 200 for monitoring and controlling operation an embodiment of the electric machine 20 described with reference to FIG. 1. Table 1 is provided as a key to FIG. 2 wherein the numerically labeled blocks and the corresponding functions are set forth as follows.

TABLE 1

| BLOCK | BLOCK CONTENTS |
|---|---|
| 202 | Execute temperature estimation routine |
| 204 | Determine $I_f$, Vcmd, Vcable, Vbrush, Vswitch, $\Psi_f$ |
| 206 | Is $|I_f| > I_{fmin}$ AND $|\Delta I_f| < I_{fmin}$ ? |
| 208 | Estimate $\frac{d\Psi_f}{dt}$ |
| 210 | $V_f = V_{cmd} - V_{cable} - V_{brush} - V_{switch} - \frac{d\Psi_f}{dt}$ |
| 212 | $R_f = V_f/I_f$ |
| 214 | Estimate $T_r$ in relation to $R_f$ |
| 216 | IS $T_r > T_{r\text{-}max}$? |
| 218 | Implement rotor temperature management control |
| 220 | End |

The temperature estimation routine 200 periodically executes during ongoing operation (202). Various electrical control variables or parameters are monitored or otherwise determined during operation, including the field current $I_f$, commanded voltage $V_{cmd}$, electrical cable voltage $V_{cable}$, electric motor brush voltage $V_{brush}$, switch voltage $V_{switch}$, and the field flux linkage $\psi_f$ (204). The use of the electrical control parameters to monitor rotor temperature minimizes need for pre-production or on-vehicle calibrations. The commanded voltage $V_{cmd}$ is processed inside controller 90 and is the result of appropriate field current regulation. The electrical cable voltage $V_{cable}$ is the voltage drop on the electric cable that connects output of the rotor inverter 50 to brushes that provide current through slip rings to the field winding of the rotor. The electrical cable voltage $V_{cable}$ can be calculated from the cable resistance and the field current. The electric motor brush voltage $V_{brush}$ is the voltage drop across brushes, which can be calibrated in relation to the field current. The switch voltage $V_{switch}$ is the average voltage drop across switching components from each phase of the power inverter 30 and can be determined in relationship to the positive and negative signals dp and do of the rotor inverter and the field current. The field flux linkage $\psi_f$ can be estimated from look-up tables as the function of stator and rotor current. The field flux linkage can be estimated in a FEA simulation model.

An absolute value of the field current $I_f$ is compared to a minimum current $I_{fmin}$ and an absolute value of a change in the field current $I_f$ is also compared to the minimum current $I_{fmin}$ (206). When the absolute value of the field current $I_f$ is greater than the minimum current $I_{fmin}$ and the absolute value of the change in the field current $I_f$ is less than the minimum current $I_{fmin}$ (206)(1), operation continues. Otherwise (206)(0), this iteration of the temperature estimation routine 200 ends (220).

A time-rate change in the field flux linkage $\psi_f$, i.e., $$\frac{d\Psi_f}{dt}$$

is estimated based upon monitored values of stator and rotor currents at two successive sampling times (210). A rotor field voltage $V_f$ can be determined in accordance with the following relationship:

$$V_f = V_{cmd} - V_{cable} - V_{brush} - V_{switch} - \frac{d\Psi_f}{dt} \quad [1]$$

wherein $V_{cmd}$ is the commanded voltage,
$V_{cable}$ is the electrical cable voltage,
$V_{brush}$ is the electric motor brush voltage,
$V_{switch}$ is the average switch voltage,
$\psi_f$ is the field flux linkage, and $$\frac{d\Psi_f}{dt}$$

is the time-rate change in the field flux linkage.
A field resistance $R_f$ associated with the rotor winding can be calculated based upon Ohm's law, as follows (212).

$$R_f = V_f/I_f$$

The rotor temperature $T_r$ can be determined in relation to the field resistance $R_f$ using a known, predetermined relationship between the field resistance $R_f$ and the rotor temperature $T_r$ for the system (214). The rotor temperature $T_r$ is compared to a maximum permissible rotor temperature $T_{r\text{-}max}$ (216), and temperature-management torque control actions can be undertaken when the rotor temperature $T_r$ exceeds the maximum permissible rotor temperature $T_{r\text{-}max}$ (216)(1). Otherwise (216)(0), this iteration of the temperature estimation routine 200 ends (220).

Temperature-management torque control actions that can be undertaken when the rotor temperature $T_r$ exceeds the maximum permissible rotor temperature $T_{r\text{-}max}$ (216)(1) include derating the maximum allowable torque output from the wound rotor synchronous electric machine when the rotor temperature is greater than the threshold rotor temperature, and controlling torque output of the wound rotor synchronous electric machine responsive to the torque command and the derated maximum allowable torque output (218). This iteration of the temperature estimation routine 200 then ends (220).

The temperature estimation routine described herein employs electrical control variables to monitor rotor temperature, and comprehends that DC field current copper losses in a rotor winding can be significant. Calibration processes to develop thermal models are minimized or eliminated, and instead electrical models of the rotor winding and the rotor winding resistance temperature dependence are employed based on known physical phenomena in the copper winding on the rotor. Some adaptation may be required to deploy the temperature estimation routine on a particular vehicle model based upon specific topology of the rotor and determination of control variable limitations, and a rotor temperature sensor becomes redundant.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a synchronous electric machine, comprising:
   determining rotor field current of a wound rotor of the synchronous electric machine;
   determining a time-rate change in a field flux linkage;
   determining a rotor field voltage based upon the time-rate change in the field flux linkage;
   determining a rotor field resistance based upon the rotor field voltage and the rotor field current;
   determining a rotor temperature based upon the rotor field resistance; and
   controlling operation of the synchronous electric machine responsive to a torque command and the rotor temperature.

2. The method of claim 1, wherein controlling operation of the synchronous electric machine comprises controlling torque output of the synchronous electric machine responsive to the torque command when the rotor temperature is less than a threshold rotor temperature.

3. The method of claim 1, wherein controlling operation of the synchronous electric machine comprises:
   derating a maximum torque output from the synchronous electric machine when the rotor temperature is greater than a threshold rotor temperature; and
   controlling torque output of the synchronous electric machine responsive to the torque command and the derated maximum torque output when the rotor temperature is greater than the threshold rotor temperature.

4. The method of claim 1, wherein the rotor field voltage is determined in accordance with the following relationship:

$$V_f = V_{cmd} - V_{cable} - V_{brush} - V_{switch} - \frac{d\Psi_f}{dt}$$

wherein $V_{cmd}$ is the commanded voltage,
   $V_{cable}$ is the electrical cable voltage,
   $V_{brush}$ is the electric motor brush voltage,
   $V_{switch}$ is the average switch voltage,
   $\psi_f$ is the field flux linkage, and $$\frac{d\Psi_f}{dt}$$

is the time-rate change in the field flux linkage.

5. Method for controlling a synchronous electric machine, comprising:
   determining rotor field current of a wound rotor of the synchronous electric machine;
   determining a time-rate change in a field flux linkage;
   determining a rotor field voltage based upon the time-rate change in the field flux linkage;
   determining a rotor temperature based upon the rotor field voltage and the rotor field current; and
   controlling operation of the synchronous electric machine responsive to the rotor temperature.

6. The method of claim 5, wherein controlling operation of the synchronous electric machine comprises controlling torque output of the synchronous electric machine when the rotor temperature is less than a threshold rotor temperature.

7. The method of claim 6, wherein controlling operation of the synchronous electric machine further comprises:
   derating a maximum torque output from the synchronous electric machine when the rotor temperature is greater than the threshold rotor temperature; and
   controlling torque output of the synchronous electric machine responsive to the derated maximum torque output.

8. The method of claim 5, wherein the rotor field voltage is determined in accordance with the following relationship:

$$V_f = V_{cmd} - V_{cable} - V_{brush} - V_{switch} - \frac{d\Psi_f}{dt}$$

wherein $V_{cmd}$ is the commanded voltage,
   $V_{cable}$ is the electrical cable voltage,
   $V_{brush}$ is the electric motor brush voltage,
   $V_{switch}$ is the average switch voltage,
   $\psi_f$ is the field flux linkage, and $$\frac{d\Psi_f}{dt}$$

is the time-rate change in the field flux linkage.

9. Method for controlling a wound rotor synchronous electric machine, comprising:
   monitoring a rotor field current of the wound rotor;
   estimating a time-rate change in a field flux linkage;
   determining a rotor field voltage based upon the time-rate change in the field flux linkage;
   determining a rotor field resistance based upon the rotor field voltage and the rotor field current;
   determining a rotor temperature based upon the rotor field resistance; and
   controlling operation of the wound rotor synchronous electric machine responsive to the rotor temperature and a torque command.

10. The method of claim 9, wherein estimating the time-rate change in the field flux linkage is based upon monitored values of stator and rotor currents at two successive sampling times.

11. The method of claim 9, wherein controlling operation of the synchronous electric machine comprises controlling torque output of the synchronous electric machine when the rotor temperature is less than a threshold rotor temperature.

12. The method of claim 11, wherein controlling operation of the synchronous electric machine further comprises:
   derating a maximum torque output from the synchronous electric machine when the rotor temperature is greater than the threshold rotor temperature, and controlling torque output of the synchronous electric machine responsive to the torque command and the derated maximum torque output.

13. The method of claim 9, wherein the rotor field voltage is determined in accordance with the following relationship:

$$V_f = V_{cmd} - V_{cable} - V_{brush} - V_{switch} - \frac{d\Psi_f}{dt}$$

wherein $V_{cmd}$ is the commanded voltage,
$V_{cable}$ is the electrical cable voltage,
$V_{brush}$ is the electric motor brush voltage,
$V_{switch}$ is the average switch voltage,
$\psi_f$ is the field flux linkage, and $$\frac{d\Psi_f}{dt}$$

is the time-rate change in the field flux linkage.

* * * * *